(12) United States Patent
Cariveau et al.

(10) Patent No.: US 8,758,463 B2
(45) Date of Patent: Jun. 24, 2014

(54) METHOD OF FORMING A THERMALLY STABLE DIAMOND CUTTING ELEMENT

(75) Inventors: Peter T Cariveau, Draper, UT (US); Ronald K Eyre, Orem, UT (US); Yi Fang, Provo, UT (US)

(73) Assignee: Smith International, Inc., Houston, TX (US)

(*) Notice: Subject to any disclaimer, the term of this patent is extended or adjusted under 35 U.S.C. 154(b) by 558 days.

(21) Appl. No.: 12/852,071

(22) Filed: Aug. 6, 2010

(65) Prior Publication Data
US 2011/0030283 A1 Feb. 10, 2011

Related U.S. Application Data

(60) Provisional application No. 61/232,228, filed on Aug. 7, 2009.

(51) Int. Cl.
*B24D 18/00* (2006.01)
(52) U.S. Cl.
USPC .............................................. 51/307; 51/293
(58) Field of Classification Search
USPC .................................................. 175/327–435
See application file for complete search history.

(56) References Cited

U.S. PATENT DOCUMENTS

| | | | |
|---|---|---|---|
| 2,941,241 A | 6/1960 | Strong | |
| 2,941,248 A | 6/1960 | Hall | |
| 2,947,611 A | 8/1960 | Bundy | |
| 3,609,818 A | 10/1971 | Wentorf, Jr. | |
| 3,767,371 A | 10/1973 | Wentorf, Jr. et al. | |
| 4,224,380 A | 9/1980 | Bovenkerk et al. | |
| 4,289,503 A | 9/1981 | Corrigan | |
| 4,311,490 A | 1/1982 | Bovenkerk et al. | |
| 4,604,106 A | 8/1986 | Hall et al. | |
| 4,664,705 A | 5/1987 | Horton et al. | |
| 4,667,756 A | 5/1987 | King et al. | |
| 4,673,414 A | 6/1987 | Lavens et al. | |

(Continued)

FOREIGN PATENT DOCUMENTS

| | | |
|---|---|---|
| EP | 0235455 | 1/1992 |
| EP | 0219959 | 4/1992 |

(Continued)

OTHER PUBLICATIONS

Umrath et al., Fundamentals of Vacuum technology, 2007, Leybold Vacuum, p. 1, 4, and 15. http://www.surface.mat.ethz.ch/education/courses/surfaces_interfaces_and_their_applications/leybold_fundamentals_of_vacuum.*

(Continued)

*Primary Examiner* — Kaj K Olsen
*Assistant Examiner* — Jared Wood

(57) ABSTRACT

In one aspect, a vacuum-sealed can is used during the bonding process to improve the properties of an infiltrated TSP cutting element. In one embodiment, ultra hard diamond crystals and a catalyst material are sintered to form a polycrystalline diamond material (PCD). This PCD material is leached to remove the catalyst, forming a thermally stable product (TSP). The TSP material and a substrate are placed into an enclosure such as a can assembly, heated, and subjected to a vacuum in order to remove gas, moisture and other residuals that can inhibit infiltration of the infiltrant into the TSP layer. The can assembly is then subjected to high temperature, high pressure bonding to bond the TSP material to the substrate. During bonding, material from the substrate infiltrates the TSP layer.

26 Claims, 3 Drawing Sheets

(56) References Cited

U.S. PATENT DOCUMENTS

| | | |
|---|---|---|
| 4,694,918 A | 9/1987 | Hall |
| 4,789,385 A | 12/1988 | Dyer et al. |
| 4,813,500 A | 3/1989 | Jones |
| 4,943,488 A | 7/1990 | Sung et al. |
| 4,954,139 A | 9/1990 | Cerutti |
| RE33,757 E | 12/1991 | Weaver |
| 5,127,923 A | 7/1992 | Bunting et al. |
| 5,290,507 A | 3/1994 | Runkle |
| 5,370,195 A | 12/1994 | Keshavan et al. |
| 5,732,783 A | 3/1998 | Truax et al. |
| 6,009,962 A | 1/2000 | Beaton |
| 6,095,265 A | 8/2000 | Alsup |
| 6,193,000 B1 | 2/2001 | Caraway et al. |
| 6,199,645 B1 | 3/2001 | Anderson et al. |
| 6,241,036 B1 | 6/2001 | Lovato et al. |
| 6,290,008 B1 | 9/2001 | Portwood et al. |
| 6,296,069 B1 | 10/2001 | Lamine et al. |
| 6,371,226 B1 | 4/2002 | Caraway |
| 6,375,706 B2 | 4/2002 | Kembaiyan et al. |
| 6,443,248 B2 | 9/2002 | Yong et al. |
| 6,458,471 B2 | 10/2002 | Lovato et al. |
| 6,461,401 B1 | 10/2002 | Kembaiyan et al. |
| 6,474,425 B1 | 11/2002 | Truax et al. |
| 6,510,906 B1 | 1/2003 | Richert et al. |
| 6,651,757 B2 | 11/2003 | Belnap et al. |
| 6,725,953 B2 | 4/2004 | Truax et al. |
| 6,742,611 B1 | 6/2004 | Illerhaus et al. |
| 6,843,333 B2 | 1/2005 | Richert et al. |
| 6,951,578 B1 | 10/2005 | Belnap et al. |
| 7,234,550 B2 | 6/2007 | Azar et al. |
| 7,350,599 B2 | 4/2008 | Lockwood et al. |
| 7,350,601 B2 | 4/2008 | Belnap et al. |
| 7,377,341 B2 | 5/2008 | Middlemiss et al. |
| 7,426,969 B2 | 9/2008 | Azar |
| 7,469,757 B2 | 12/2008 | Azar et al. |
| 7,497,280 B2 | 3/2009 | Brackin et al. |
| 7,533,740 B2 | 5/2009 | Zhang et al. |
| 7,575,425 B2 | 8/2009 | Hall |
| 7,757,793 B2 | 7/2010 | Voronin et al. |
| 7,845,438 B1 * | 12/2010 | Vail et al. ............ 175/434 |
| 8,236,074 B1 * | 8/2012 | Bertagnolli et al. ............ 51/307 |
| 8,313,677 B2 | 11/2012 | Hall et al. |
| 8,328,891 B2 | 12/2012 | Zhang et al. |
| 2001/0000101 A1 | 4/2001 | Lovato et al. |
| 2001/0002557 A1 | 6/2001 | Kembaiyan et al. |
| 2001/0008190 A1 | 7/2001 | Scott et al. |
| 2001/0047891 A1 | 12/2001 | Truax et al. |
| 2002/0125048 A1 | 9/2002 | Traux et al. |
| 2003/0111273 A1 | 6/2003 | Richert et al. |
| 2004/0037948 A1 | 2/2004 | Tank et al. |
| 2004/0154840 A1 | 8/2004 | Azar et al. |
| 2004/0245022 A1 | 12/2004 | Izaguirre et al. |
| 2005/0044800 A1 * | 3/2005 | Hall et al. ............ 51/307 |
| 2005/0133276 A1 | 6/2005 | Azar |
| 2005/0133278 A1 | 6/2005 | Azar |
| 2005/0230150 A1 | 10/2005 | Oldham et al. |
| 2006/0032677 A1 | 2/2006 | Azar et al. |
| 2006/0166615 A1 | 7/2006 | Tank et al. |
| 2006/0191723 A1 | 8/2006 | Keshavan |
| 2006/0283637 A1 | 12/2006 | Viel et al. |
| 2007/0215389 A1 | 9/2007 | Da Silva et al. |
| 2007/0215390 A1 | 9/2007 | Azar et al. |
| 2007/0284153 A1 | 12/2007 | Richert et al. |
| 2008/0017421 A1 | 1/2008 | Lockwood |
| 2008/0057145 A1 * | 3/2008 | Hall et al. ............ 425/77 |
| 2008/0073126 A1 | 3/2008 | Shen et al. |
| 2008/0085407 A1 | 4/2008 | Cooley |
| 2008/0115421 A1 | 5/2008 | Sani |
| 2008/0128951 A1 | 6/2008 | Lockwood et al. |
| 2008/0135306 A1 | 6/2008 | Da Silva et al. |
| 2008/0142262 A1 | 6/2008 | Drivdahl et al. |
| 2008/0142276 A1 | 6/2008 | Griffo et al. |
| 2008/0149398 A1 | 6/2008 | Azar |
| 2008/0185189 A1 | 8/2008 | Griffo et al. |
| 2008/0202821 A1 | 8/2008 | McClain et al. |
| 2008/0206576 A1 | 8/2008 | Qian |
| 2008/0223623 A1 * | 9/2008 | Keshavan et al. ............ 175/434 |
| 2008/0230280 A1 | 9/2008 | Keshavan et al. |
| 2008/0282618 A1 | 11/2008 | Lockwood |
| 2009/0090563 A1 | 4/2009 | Voronin et al. |
| 2009/0095532 A1 | 4/2009 | Laird et al. |
| 2009/0107732 A1 | 4/2009 | McClain et al. |
| 2009/0120008 A1 | 5/2009 | Lockwood et al. |
| 2009/0133938 A1 | 5/2009 | Hall et al. |
| 2009/0152017 A1 | 6/2009 | Shen et al. |
| 2009/0152018 A1 | 6/2009 | Sani |
| 2009/0173015 A1 | 7/2009 | Keshavan |
| 2009/0173547 A1 | 7/2009 | Voronin et al. |
| 2009/0273224 A1 | 11/2009 | Hall |
| 2010/0012389 A1 | 1/2010 | Zhang et al. |
| 2010/0062253 A1 | 3/2010 | Egan et al. |
| 2010/0196717 A1 | 8/2010 | Liversage et al. |
| 2010/0236836 A1 | 9/2010 | Voronin |
| 2010/0243337 A1 | 9/2010 | Scott |
| 2010/0281782 A1 | 11/2010 | Keshavan et al. |
| 2010/0300767 A1 | 12/2010 | Cariveau et al. |
| 2010/0320006 A1 | 12/2010 | Fan et al. |
| 2011/0031032 A1 | 2/2011 | Mourik et al. |
| 2011/0031033 A1 | 2/2011 | Mourik et al. |
| 2011/0031037 A1 | 2/2011 | Bellin et al. |
| 2011/0036643 A1 | 2/2011 | Belnap et al. |
| 2011/0042147 A1 | 2/2011 | Fang et al. |
| 2012/0222364 A1 | 9/2012 | Lyons et al. |
| 2013/0074420 A1 | 3/2013 | Zhang et al. |

FOREIGN PATENT DOCUMENTS

| | | |
|---|---|---|
| EP | 0374424 | 1/1995 |
| EP | 0487355 | 3/1995 |
| EP | 1006257 | 2/2004 |
| EP | 1330323 | 5/2006 |
| WO | 0234437 | 5/2002 |
| WO | 2008076908 | 6/2008 |
| WO | 2010020962 | 2/2010 |

OTHER PUBLICATIONS

International Search report and Written Opinion dated Mar. 23, 2011 for corresponding PCT application No. PCT/US2010/044731 filed Aug. 6, 2010.

International Search Report and Written Opinion of PCT Application No. PCT/US2010/044797 dated Mar. 29, 2011: pp. 1-9.

Anonymous, "PCD Hammer Bit Inserts," Guilin Coller Engineered Diamond Technology (EDT) Co., Ltd., Mar. 2010: pp. 1-5.

Extended European Search Report of European Application No. 10807238.0 dated Feb. 28, 2014: pp. 1-9.

Extended European Search Report of European Application No. 10807268.7 dated Mar. 11, 2014: pp. 1-14.

* cited by examiner

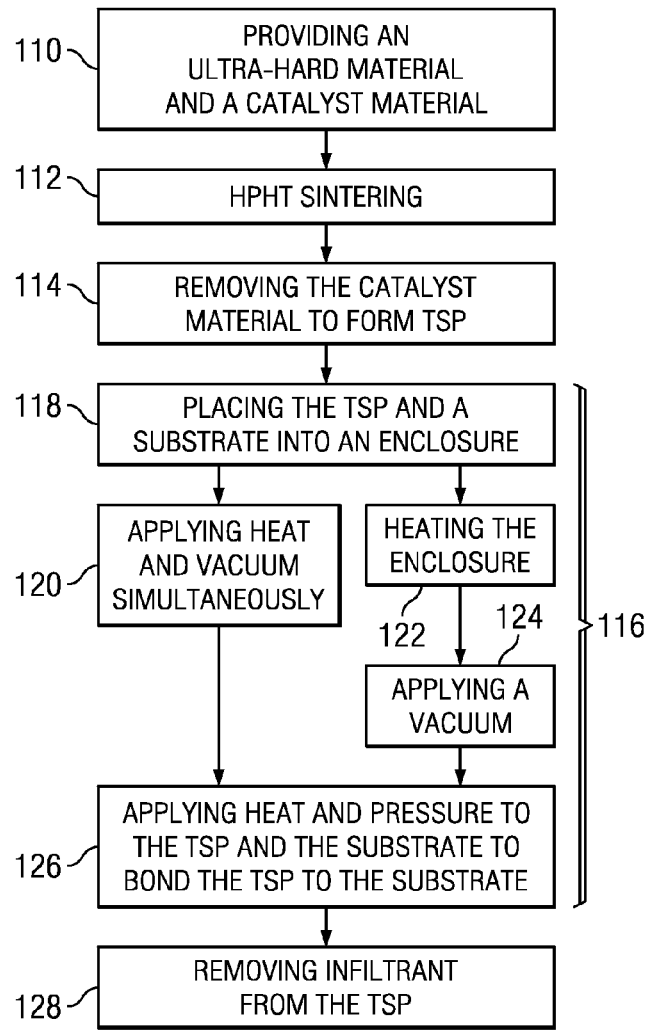
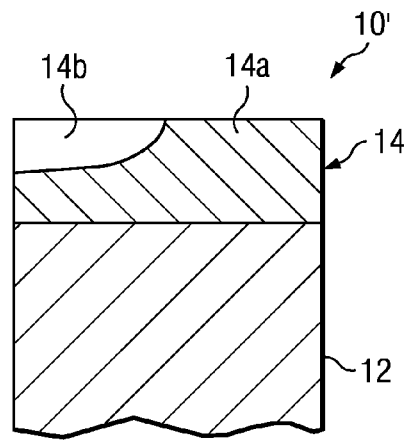
FIG. 2A
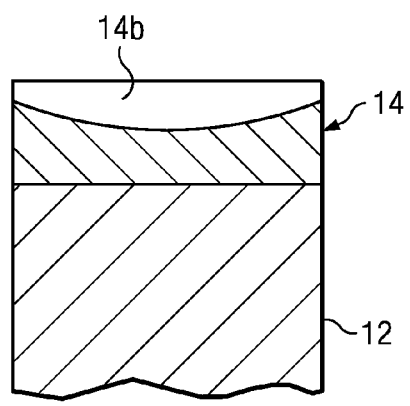
FIG. 2B
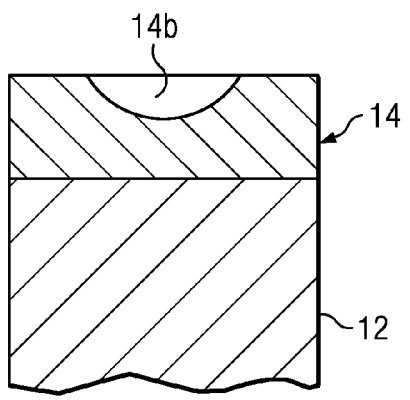
FIG. 2C
FIG. 1

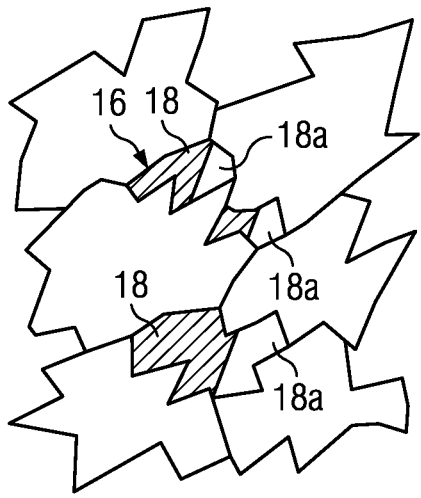
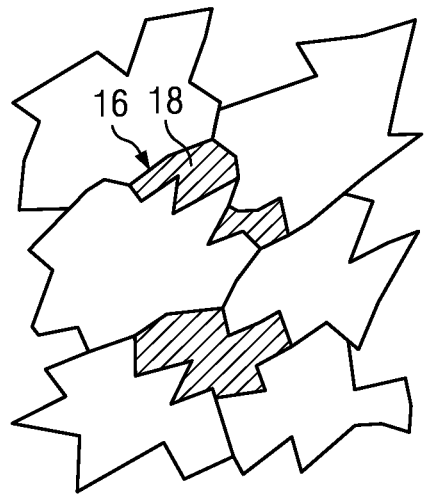
*FIG. 3A*  *FIG. 3B*
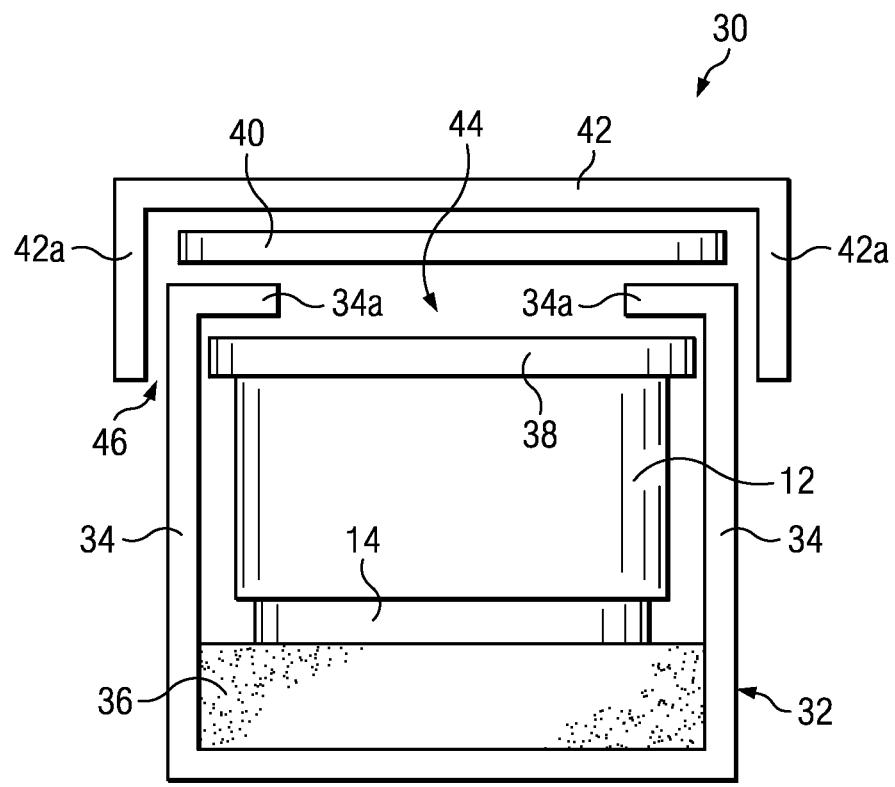
*FIG. 4*

METHOD OF FORMING A THERMALLY STABLE DIAMOND CUTTING ELEMENT

CROSS-REFERENCE TO RELATED APPLICATIONS

This application claims priority to U.S. Provisional Application No. 61/232,228, filed Aug. 7, 2009, which is hereby incorporated by reference in its entirety.

BACKGROUND OF THE INVENTION

Cutting elements, such as shear cutter type cutting elements used in rock bits or other cutting tools, typically have a body (i.e., a substrate) and an ultra hard material. The ultra hard material forms the cutting surface of the cutting element, and the substrate is typically provided for the purpose of attaching the ultra hard material to the cutting tool. The substrate is generally made from tungsten carbide-cobalt (sometimes referred to simply as "cemented tungsten carbide," "tungsten carbide" or "carbide"). The ultra hard material layer is a polycrystalline ultra hard material, such as polycrystalline diamond ("PCD"), polycrystalline cubic boron nitride ("PCBN") or thermally stable product ("TSP") such as thermally stable polycrystalline diamond. The ultra hard material provides a high level of wear and/or abrasion resistance that is greater than that of the metallic substrate.

The PCD material is formed by a known process in which diamond crystals are mixed with a catalyst material and sintered with a substrate at high pressure and high temperature. Catalyst from the substrate also infiltrates the diamond crystals during the sintering process. This sintering process creates a polycrystalline diamond structure having a network of intercrystalline bonded diamond crystals, with the catalyst material remaining in the voids or gaps between the bonded diamond crystals. The catalyst material facilitates and promotes the inter-crystalline bonding. The catalyst material is typically a solvent catalyst metal from Group VIII of the Periodic table (CAS version of the periodic table in the CRC Handbook of Chemistry and Physics), such as cobalt. However, the presence of the catalyst material in the sintered PCD material introduces thermal stresses to the PCD material, when the PCD material is heated, as for example by frictional heating during use, as the catalyst typically has a higher coefficient of thermal expansion than does the PCD material. Thus, the sintered PCD is subject to thermal stresses, which limit the service life of the cutting element. Furthermore, when the operating or servicing temperature reaches or exceeds 700° C., the diamond structure in the PCD layer converts back to graphite with the presence of Group VIII catalyst material, causing structural disintegration in the PCD layer.

To address this problem, the catalyst is substantially removed from the PCD material, such as by leaching, in order to create TSP. For example, one known approach is to remove a substantial portion of the catalyst material from at least a portion of the sintered PCD by subjecting the sintered PCD construction to a leaching process, which forms a TSP material portion substantially free of the catalyst material. The entire PCD layer can be subjected to this leaching process to remove the catalyst material. If the PCD material is attached to a substrate, the substrate and the PCD material can be separated from each other either before or after the leaching process.

After the TSP material has been formed, it is bonded onto a substrate in order to form a cutting element. During this bonding process, the TSP material and substrate are subjected to heat and pressure. An infiltrant material (such as cobalt from the substrate) infiltrates the TSP material, moving into the voids (i.e., the interstitial spaces) between the bonded crystals, previously occupied by the catalyst material. Other metal or metal alloy or non-metallic infiltrants may be used in addition to or instead of cobalt from the substrate. After bonding, the infiltrant(s) can be removed from a portion of the infiltrated TSP material. For example, the infiltrant can be leached from the cutting surface of the infiltrated TSP (opposite the substrate) to remove the infiltrant materials in order to create a thermally stable cutting surface, while retaining the infiltrant in the portion of the infiltrated TSP closer to the substrate, in order to retain a strong bond between the diamond layer and the substrate.

During the catalyst removing step, when the catalyst material is removed from the PCD to form TSP, some residual materials are left behind in the voids between the diamond crystals. Some residuals may be, for example, the residual cobalt carbides in the voids not completely digested by the leaching agent, and corresponding oxides forming afterwards. The presence of these residuals hinders the infiltration of cobalt (or other infiltrant) into the TSP during bonding. Additionally, gases, moisture, and residual leaching agent occupy the voids between the diamond crystals. These gases, moisture, oxides, and other residuals inhibit the infiltration of the infiltrant into the TSP material, as they exert a force against the infiltrant material that is moving into the TSP.

The result is TSP material that is only partially infiltrated or not properly infiltrated, as the infiltration path is blocked by those residual materials. Partial infiltration is problematic, as thermal and other stresses build in the non-infiltrated region of the TSP. Partial infiltration also makes leaching more difficult, and weakens the bond between the TSP layer and the substrate. Partial infiltration also creates inconsistencies in the performance of the TSP cutting elements. Accordingly, there is a need for a system and method for forming TSP material that facilitates infiltration during bonding, and improves the thermal characteristics of the material.

SUMMARY OF THE INVENTION

The present invention involves the use of a vacuum-sealed can during a bonding process to improve the properties of an infiltrated TSP cutting element. In one embodiment, ultra hard diamond crystals and a catalyst material are sintered to form a polycrystalline diamond material (PCD). This PCD material is at least partially leached to remove the catalyst, forming a thermally stable product (TSP). The TSP material and a substrate are placed into an enclosure such as a can assembly, heated, and subjected to a vacuum in order to remove gas, moisture and other residuals that can inhibit infiltration of the infiltrant into the TSP layer. The can assembly is then subjected to high temperature, high pressure bonding to bond the TSP material to the substrate. During bonding, material from the substrate infiltrates the TSP layer. This method produces a bonded TSP cutting element that is more fully infiltrated than TSP cutting elements created through prior art methods.

In one embodiment, a method for forming a cutting element includes sintering diamond crystals and a catalyst material at high temperature and high pressure to form a polycrystalline diamond material, removing at least a substantial portion of the catalyst material from the polycrystalline diamond material to form a thermally stable polycrystalline diamond body, and bonding the thermally stable polycrystalline diamond body to a substrate. The bonding process includes placing the thermally stable polycrystalline diamond body and the substrate into an enclosure, heating the thermally stable polycrystalline diamond body and the substrate to remove residual materials from the thermally stable polycrystalline diamond body, subjecting the thermally stable polycrystalline diamond body and the substrate to a vacuum for evacuating such residual materials, and pressing the thermally stable polycrystalline diamond body and the substrate at an elevated temperature to bond the thermally stable polycrystalline diamond body to the substrate. In an embodiment, the vacuum is initiated prior to heating, and then is maintained during the heating to remove the residual materials.

In another embodiment, a method of forming a thermally stable polycrystalline diamond cutting element includes sintering a plurality of diamond crystals and a catalyst material at high temperature and high pressure to form a polycrystalline diamond material, removing substantially all of the catalyst material from at least a portion of the polycrystalline diamond material to form a thermally stable material, placing the thermally stable material and a substrate into an enclosure having an opening, sealing the enclosure for maintaining a vacuum inside the enclosure, and bonding the thermally stable material to the substrate inside the vacuum-sealed enclosure at high temperature and high pressure to form a bonded thermally stable polycrystalline diamond cutting element.

In another embodiment, a method of forming a thermally stable polycrystalline diamond cutting element includes forming a polycrystalline diamond material attached to a first substrate, separating the first substrate from the polycrystalline diamond material, leaching the polycrystalline diamond material to remove a substantial portion of a catalyst material and form a thermally stable polycrystalline diamond material having a residual portion comprising an oxide or gas, and bonding the thermally stable polycrystalline diamond material to a second substrate at a vacuum sufficient to remove at least 80% of the residual portion from the thermally stable polycrystalline diamond material.

Diamond bonded constructions prepared according to principles of the invention have improved thermal characteristics, as the infiltrated TSP material is more fully infiltrated during the bonding step. The improved infiltration of the TSP reduces thermal stresses in the material and facilitates leaching of the cutting surface, which in turn provides a cutting surface with improved properties of thermal stability, abrasion resistance, and wear resistance while maintaining a high bond strength.

BRIEF DESCRIPTION OF THE DRAWINGS

FIG. 1 is a flowchart of a method of forming a bonded TSP cutting element according to an embodiment of the invention.

FIG. 2A is a partial cross-sectional view of a partially-infiltrated TSP cutting element.

FIG. 2B is a partial cross-sectional view of a partially-infiltrated TSP cutting element.

FIG. 2C is a partial cross-sectional view of a partially-infiltrated TSP cutting element.

FIG. 3A is a representation of a partially-infiltrated void in a TSP material.

FIG. 3B is a representation of a more fully-infiltrated void in a TSP material according to an embodiment of the invention.

FIG. 4 is a cross-sectional view of an assembly for bonding according to an embodiment of the invention.

DETAILED DESCRIPTION OF THE INVENTION

Figure 5:
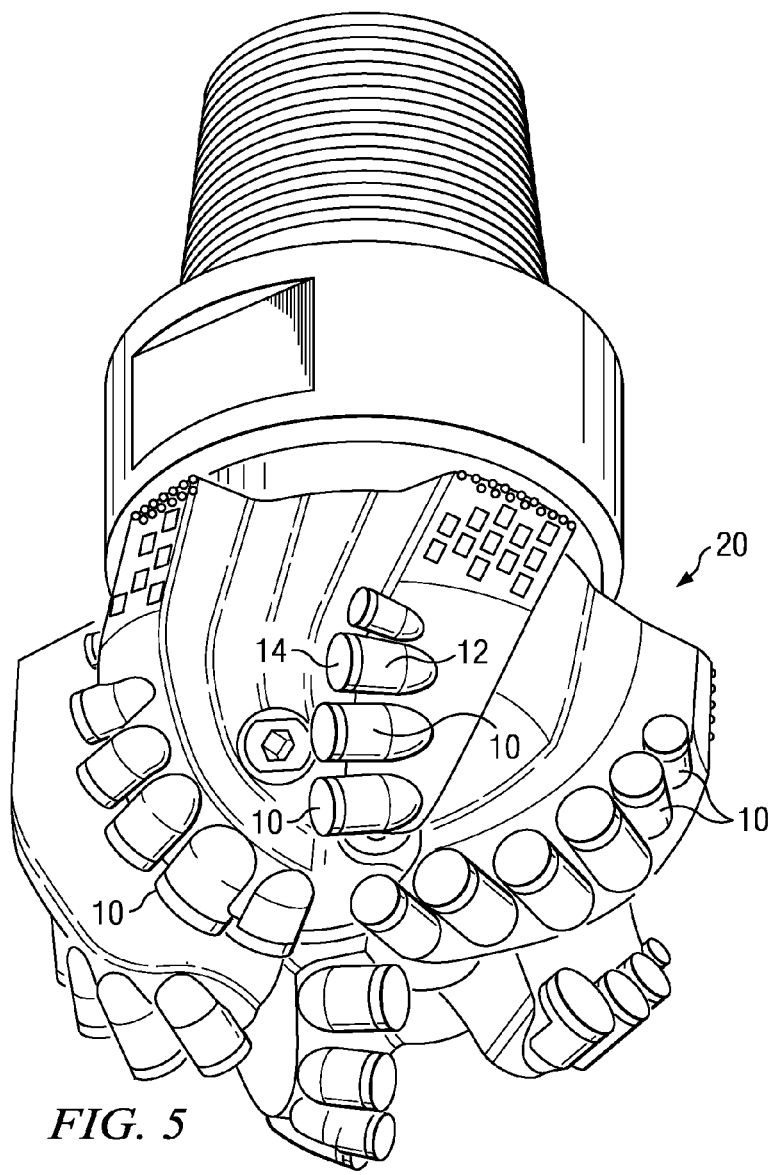
FIG. 5 is a perspective view of a drag bit body including a cutting element according to an embodiment of the invention.

The present invention involves the use of a vacuum-sealed enclosure during a bonding process to improve the properties of an infiltrated TSP cutting element. In one exemplary embodiment, diamond crystals and a catalyst material are high-pressure high-temperature sintered to form a polycrystalline diamond material (PCD). If a substrate is present during this sintering step, catalyst material from the substrate infiltrates the diamond crystal layer. After sintering, the substrate is removed. The catalyst is removed from the PCD, forming a thermally stable product (TSP). In this leaching or removal process, substantially all (about 95% or more, for example 98% or more, or even 99% or more) of the catalyst is removed from at least a portion of the PCD, forming TSP. Alternatively, leaching can be done prior to removing the substrate from the PCD. The TSP is then bonded to a substrate via an HPHT bonding process. The TSP material and the substrate are placed into an enclosure such as a can assembly, heated, and subjected to a vacuum in order to remove gas, moisture, residual leaching agent, and other residuals that can inhibit infiltration of the TSP layer. The TSP material is then bonded to the substrate in a HPHT bonding process. During bonding, an infiltrant such as metal from the substrate infiltrates the TSP layer. Other infiltrants may be used, instead of or in addition to material from the substrate. This method produces a bonded, infiltrated TSP cutting element that is more fully infiltrated than TSP cutting elements created through prior art methods. After the bonding, a portion of the infiltrated TSP cutting layer, such as the top portion of the layer opposite the substrate, may be leached to form a thermally stable cutting surface.

An exemplary embodiment of a method of forming an infiltrated, bonded TSP cutting element according to the present invention is outlined in FIG. 1. The method includes providing an ultra-hard material and a catalyst material 110, and then sintering these materials at high pressure and high temperature (HPHT sintering) 112. The high pressure may be 5,000 MPa or greater, and the high temperature may be about 1,300° C. to 1,500° C. or higher. Optionally, prior to sintering, the ultra-hard and catalyst materials are heated under vacuum to cleanse them. The ultra-hard material is preferably diamond provided in the form of natural and/or synthetic diamond powders. Exemplary diamond crystal sizes are in the range of about 2-50 micron.

The catalyst material may be a metal from Group VIII of the Periodic table (CAS version of the periodic table in the CRC Handbook of Chemistry and Physics), such as cobalt. This material can be provided in powder form and mixed with the ultra hard material to form a uniform distribution, or a substrate, such as a tungsten carbide substrate (WC—Co), may be provided as the source of the catalyst material. If a substrate is used, such as a WC—Co substrate, the catalyst from the substrate, i.e., the cobalt, moves into the voids between the diamond crystals during the HPHT sintering. The catalyst material encourages the growth and bonding of crystals during the HPHT sintering to form polycrystalline diamond. As used herein, the term "catalyst material" refers to the material that is initially used to facilitate diamond-to-diamond bonding or sintering during the initial HPHT process used to form the PCD.

Figure 6A:
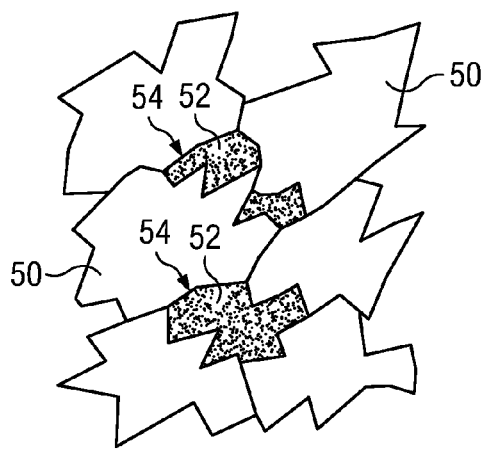
FIG. 6A is a representation of a polycrystalline diamond structure with catalyst material occupying the voids.

The HPHT sintering 112 creates a polycrystalline structure as shown in FIG. 6A, in which the diamond crystals 50 are bonded together, with the catalyst material 52 remaining dispersed within the interstitial regions or voids 54 between the diamond crystals 50. However, as mentioned above, the catalyst material introduces thermal stresses to the PCD material during heating, as the catalyst typically has a higher coefficient of thermal expansion than does the PCD. Thus, the method includes removing (such as by leaching) the catalyst material from the PCD material 114 to form a TSP material that is substantially free of the catalyst material.

The leaching can be accomplished by subjecting the PCD material to a leaching agent (such as an acid wash) over a particular period of time or by other known leaching methods such as electrolytic process, and others. When reference is made to leaching or removing the catalyst material from the PCD, it should be understood to mean that a substantial portion of the catalyst material is removed from the part. However, it should also be understood that some small/trace amount of catalyst material may still remain in the TSP part, such as within the interstitial regions or adhered to the surface of the diamond crystals. Thus, the leaching or removal process creates a TSP material in which substantially all (about 95% or more, as for example at least 98% or at least 99%) of the catalyst material has been removed from at least a portion of the PCD. In an embodiment, the catalyst material is removed from at least a surface of the PCD. When the resulting TSP layer is bonded to a new substrate, this leached surface faces the substrate so that infiltrant from the substrate can move into the ultra-hard layer, moving into the voids left by the catalyst. In an embodiment, the catalyst material is removed from the entire PCD layer.

Figure 6B:
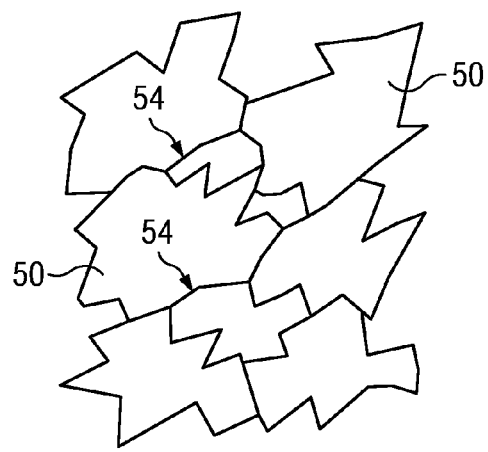
FIG. 6B is a representation of a leached polycrystalline diamond structure with substantially empty voids.

Once the catalyst material has been removed, the result is a thermally stable polycrystalline diamond product or body ("TSP"). The TSP body has a material microstructure characterized by a polycrystalline phase of bonded-together diamond crystals 50 and a plurality of substantially empty voids 54 between the bonded diamond crystals 50, as shown in FIG. 6B. These voids 54 are substantially empty due to the removal of the catalyst material during the leaching process described above.

Referring again to FIG. 1, the TSP material is then subjected to a bonding process 116. In an embodiment, the substrate includes as one of its material constituents a metal solvent that is capable of melting and infiltrating into the TSP material. In one embodiment, the substrate is tungsten carbide with a cobalt binder (WC—Co), and the cobalt acts as the metal solvent infiltrant in the bonding step. In other embodiments, other infiltrants such as other metals or metal alloys may be utilized. If an additional infiltrant is used, it may be provided in the form of a powder or a sheet or disc of material that is positioned between the TSP and the substrate, or on the side of the TSP opposite the substrate. The infiltrant may be a combination of cobalt from the substrate and this other added infiltrant.

The bonding process 116 includes placing the TSP material and the substrate into an enclosure 118, such as a can assembly, which protects the TSP material and substrate during bonding. The enclosure will now be described, referring to FIG. 4, which shows a can assembly 30 according to an embodiment of the invention. The can assembly 30 includes a can 32 with a peripheral wall 34. The can 32 is typically constructed from a refractory metal such as for example tantalum, niobium, or molybdenum-zirconium alloy. The purpose of the can is to protect the TSP and the substrate from reacting with the surrounding vacuum furnace or press assembly during HPHT bonding. The can may be cylindrical, with one curving peripheral wall 34, or it may be any other suitable shape for enclosing the TSP material and substrate.

The substrate 12 and TSP layer 14 are placed in the can through a top opening 44, with the substrate 12 above the TSP layer 14. The TSP layer rests on an insulator layer 36 that prevents the TSP material from touching and reacting with the walls and floor of the can 32. In an exemplary embodiment, the insulator is in powder form. The TSP and substrate are pushed down into the can to cause the insulator 36 to flow up around the sides of the TSP layer and the substrate. The insulator material is a non-sintering, non-reacting material such as hexagonal boron nitride (HBN), cubic boron nitride (CBN), silicon nitride, an oxide, or a ceramic. HBN is preferred for its good flowability. The insulator layer insulates the can from the TSP diamond and vice versa. A disc 38 made from the same material as the can is placed on top of the substrate 12 in the can, as shown in FIG. 4, to form a top surface or lid on the can 32.

After the insulator layer 36, TSP material 14, substrate 12, and disc 38 are placed into the can 32, and the TSP and substrate have been pushed down into the insulator, the top end 34a of the peripheral wall 34 of the can is folded over to retain these materials in the can 32. A layer or disc of braze material 40 is placed on top of the disc 38 and folded end 34a, whereby the folded end is sandwiched between the disc 38 and the braze material disc 40. In an exemplary embodiment, the folded portion overlaps the disc 38 along its entire periphery. Finally, a can cap or lid 42 is placed over the braze material to complete the can assembly 30. Optionally, the outer end 42a of the cap 42 is folded over as shown in FIG. 4 to further seal the can and prevent the braze material from leaking out of the can as it melts.

The braze material 40 may be provided in the form of a disc 40, as shown in FIG. 4, or a ring or other suitable shapes. The braze material in an exemplary embodiment is a metal such as copper, nickel, or an alloy, with a melting point that is within the temperature range where diamond is thermodynamically stable. The melting point should be high enough that the braze does not melt while the TSP material is being cleaned (as described below), but low enough that the TSP material is not damaged when the temperature is raised to melt the braze. Thus, the melting temperature of the braze should be lower than the temperature at which the diamond is heated during the HTHP sintering process 112 (see FIG. 1). In one embodiment, the braze material has a melting point between about 600° C. and 1,200° C.

Referring again to FIG. 1, the method includes placing the TSP and substrate into an enclosure 118, such as the can assembly 30 shown in FIG. 4. The TSP material and substrate are then heated inside the can assembly. This heating is beneficial to clean the materials and promote outgassing prior to the final HPHT bonding, in order to reduce the amount of residuals that interfere with infiltration.

The method also includes applying a vacuum to the can assembly. In an exemplary embodiment, the vacuum is applied by a vacuum furnace. The vacuum can be applied after the heating step is completed, or the vacuum can be initiated before heating and maintained simultaneously with the heating. Thus, referring to FIG. 1, an embodiment of the invention includes applying the heat and vacuum simultaneously 120. This does not mean the heat and vacuum are both initiated at the same time, but that the vacuum is maintained while the heating is performed, so that the can is exposed to both vacuum and heat at the same time. In an exemplary embodiment, the can assembly is placed inside a vacuum furnace. A vacuum is drawn and then the heat is applied in two steps. The can assembly with the TSP material and substrate is raised to a first temperature that is below the melting point of the braze material. The heat and vacuum promote outgassing of the TSP material to remove residual material that was left in the TSP voids after the leaching process. This first temperature may fall within the range 600-700° C. During this first heating step, before the braze melts, the can is open to the surrounding atmosphere through gaps or openings 46 between the can 32 and lid 42. These gaps 46 allow materials to outgas and escape from the TSP material. The vacuum facilitates the evacuation of these materials from the TSP.

While maintaining the vacuum, the temperature is then raised to a second temperature that is equal to or higher than the melting point of the braze. This temperature may be just past the melting temperature of the braze. This second temperature may be between 800-1200° C. As the braze melts, it flows around the cap 42 and on disc 38 to seal the top opening 44 of the can 32. After the braze has melted and flowed into the gaps 46, the temperature is lowered so that the braze cools and solidifies to seal the can. The vacuum is maintained as the braze solidifies, such that a vacuum is created inside the sealed can. In one embodiment, the vacuum inside the can is $10^{-4}$ Torr or lower, and preferably $10^{-5}$ Torr or even $10^{-6}$ Torr or lower. The vacuum may be within the typical pressure range of any suitable commercially-available vacuum furnace.

Alternatively, the can assembly can be heated first and then subjected to vacuum. Thus, in an embodiment, the bonding process includes heating the can 122 and then (sequentially) applying a vacuum 124. The material is heated to a temperature that is high enough to clean the TSP and substrate materials, as described before. Then, the can assembly is allowed to cool to room temperature. A vacuum is applied to evacuate all of the residuals and gases that accumulated during the heating step. The can is then sealed at room temperature such as by welding it closed, so that a vacuum is formed inside the can. Electron beam welding ("EB welding") is well known as a sealing process. In this embodiment, it is not necessary to include the braze disc 40.

In both cases (applying the heat and vacuum simultaneously 120 or sequentially 122, 124), in an exemplary embodiment the vacuum is sufficient to remove at least 20% of the residuals in the TSP layer, and in another embodiment at least 50%, and in another embodiment at least 80%. In exemplary embodiments, the vacuum is sufficient to remove at least 95% of the residuals in the TSP layer, such as about 98% or about 99%. The amount of residuals removed from the TSP layer can be determined through gas fusion analysis.

The vacuum furnace may be any suitable, commercially-available vacuum furnace, such as one provided by Centorr Vacuum Industries, of Nashua, N.H. A combination of a mechanical pump and a turbomolecular vacuum pump/diffusion pump may be used. The can assembly is typically cooled to room temperature inside the vacuum furnace after it is heated and sealed. A vacuum may still be applied while the sealed can assembly is cooling to room temperature.

Finally, the bonding process 116 includes applying heat and pressure to the sealed can, with the TSP and the substrate inside, to bond the TSP to the substrate 126. This can be referred to as "HPHT bonding" and includes placing the vacuum-sealed can assembly into an HPHT assembly and pressing it at high heat and pressure to bond the TSP material to the substrate. The HTHP bonding step may have different durations, temperatures, and pressures than the HTHP sintering step. For example, the temperatures and pressures may be lower during bonding than during HPHT sintering 112. During this final bonding step, an infiltrant will infiltrate the leached TSP material, moving into the voids between the diamond crystals and acting as a glue to bond the TSP layer to the substrate. The infiltrant is typically a metal from the substrate, such as cobalt, but other infiltrants such as other metals or metal alloys may be used. For example, an added infiltrant in the form of a powder, foil, or film may be provided between the TSP and substrate to infiltrate both the TSP layer and the substrate and facilitate bonding of these two layers, or additional infiltrant may be placed on the side of the TSP layer opposite the substrate. The term "infiltrant" as used herein refers to a material other than the catalyst material used to initially form the PCD material, and can include materials in Group VIII of the Periodic table (CAS version of the periodic table in the CRC Handbook of Chemistry and Physics). In an exemplary embodiment, the lower half of the TSP layer (nearest the substrate) is substantially infiltrated by the infiltrant.

Optionally, after bonding, the infiltrant can be removed from a portion of the infiltrated TSP material 128, as for example from the portion that does the cutting and is exposed to high frictional heat, to improve the thermal stability of that portion of the TSP layer. For example, in one embodiment, substantially all of the infiltrant is removed by leaching from the exposed cutting surface of the TSP layer to a certain depth, but not all the way through the TSP layer to the substrate. Thus, a portion of the infiltrated TSP layer closer to the substrate still retains the infiltrant in the voids between the diamond crystals. The presence of the infiltrant here preserves the bonding of the infiltrated TSP layer to the substrate. As before, in the areas where substantially all of the infiltrant is removed, trace amounts of infiltrant may remain. The TSP material layer having at least a portion leached of an infiltrant may be infiltrated with an oxide, nitride or a ceramic for improving the TSP material toughness and wear resistance.

The infiltrated TSP cutting element can then be incorporated into a cutting tool such as a tool for mining, cutting, machining, milling, and construction applications, where properties of thermal stability, wear and abrasion resistance, and reduced thermal stress are desirable. For example, the cutting element of this invention may be incorporated into machine tools and drill and mining bits such as roller cone drill bits, and drag bits (fixed cutter drill bits). FIG. 5 shows a cutting element 10 with substrate 12 and infiltrated TSP layer 14, incorporated into a drag bit body 20.

Maintaining a vacuum in the can assembly during bonding improves the infiltration of the infiltrant material into the TSP diamond interstitial spaces. The vacuum prevents residual materials and outgases from pushing against the infiltrant and blocking its path. As a result, the infiltrant can move more easily into the TSP layer, and the TSP layer is more fully infiltrated than a TSP material formed without maintaining a vacuum during the bonding process, providing for a better bond between the TSP layer and the substrate. Fully infiltrating the TSP reduces stresses between infiltrated and non- or partially-infiltrated regions. Vacuum sealing aids in fully infiltrating thicker TSP layers and enhances process consistency.

For example, FIGS. 2A-2C show three examples of a TSP cutting element 10', which has been bonded without applying a vacuum, resulting in partial infiltration. The cutting element 10' includes a substrate 12 and TSP layer 14. After bonding, the TSP layer 14 has been partially infiltrated, resulting in an infiltrated portion 14a and non-infiltrated portion 14b. The non-infiltrated portion 14b is typically located near the surface of the TSP layer opposite the substrate, as the infiltrant from the substrate has to cross a larger distance to reach this portion. The non-infiltrated portion 14b may extend from one side of the TSP layer, as shown in FIG. 2A, or it may cross from one side to the other, as shown in FIG. 2B, or it may extend down from the top surface of the TSP layer, as shown in FIG. 2C. In each of these scenarios, the partial infiltration of the TSP, due to the presence of non-infiltrated regions in the TSP, generates residual stresses in the TSP layer at the interfaces between the infiltrated and non-infiltrated regions. During HPHT bonding, the material infiltrating the TSP layer applies pressure to the TSP in the areas it infiltrates. However, the non-infiltrated areas are not subjected to the same pressure. As a result, the infiltrated and non-infiltrated regions have different stress states after the bonding process, leading to residual stresses at the interface between these regions. These stresses weaken the TSP layer and can lead to early failure of the TSP cutting element.

As explained above, during bonding, the metal infiltrant moves into voids between bonded diamond crystals. When the TSP layer is only partially infiltrated, due to the presence of residual materials as described above, the voids 16 will be only partially filled with the infiltrant 18, leaving un-filled areas 18a, as shown in FIG. 3A. When the TSP layer is fully infiltrated, the void 16 is more completely filled with the infiltrant 18, as shown in FIG. 3B. These figures are not meant to indicate that all voids in the bonded TSP are fully infiltrated, as shown in FIG. 3B. Instead, with the method of this invention, a greater percentage of the voids will be substantially infiltrated, and/or the voids will be infiltrated to a greater extent than with prior art methods. For example, in one embodiment, the areas of the infiltrated TSP near the cutting surface, opposite the substrate, are more fully infiltrated than with prior art methods. In another embodiment, the areas of the re-infiltrated TSP near the substrate are more fully infiltrated, creating a better bond between the TSP and the substrate, than with prior art methods.

Relative sizes are exaggerated in FIGS. 2A-2C, 3A-3B, 4, and 6A-6B for clarity, and are not necessarily to scale.

Although the present invention has been described and illustrated in respect to exemplary embodiments, it is to be understood that it is not to be so limited, since changes and modifications may be made therein which are within the full intended scope of this invention as hereinafter claimed. For example, the infiltrants identified herein for infiltrating the TSP material have been identified by way of example. Other infiltrants may also be used to infiltrate the TSP material and include any metals and metal alloys such as Group VIII and Group IB metals and metal alloys (CAS version of the periodic table in the CRC Handbook of Chemistry and Physics). Moreover, it should be understood that the TSP material may be attached to other carbide substrates besides tungsten carbide substrates, such as substrates made of carbides of W, Ti, Mo, Nb, V, Hf, Ta, and Cr.

What is claimed is:

1. A method for forming a cutting element, comprising:
   sintering diamond crystals and a catalyst material at high temperature and high pressure to form a polycrystalline diamond material body;
   removing at least a substantial portion of the catalyst material from the polycrystalline diamond material body to form a thermally stable polycrystalline diamond body; and
   bonding the thermally stable polycrystalline diamond body to a substrate, wherein bonding comprises:
      placing the thermally stable polycrystalline diamond body and the substrate into an enclosure,
      heating the thermally stable polycrystalline diamond body and the substrate to remove residual materials from the thermally stable polycrystalline diamond body;
      subjecting the thermally stable polycrystalline diamond body and the substrate to a vacuum for evacuating such residual materials;
      pressing the enclosure, the thermally stable polycrystalline diamond body and the substrate while maintaining a vacuum in said enclosure to bond the thermally stable polycrystalline diamond body to the substrate, wherein said thermally stable polycrystalline diamond body and said substrate are pressed at an elevated temperature; and
      preventing contact of said thermally stable polycrystalline diamond body with the enclosure during pressing.

2. The method of claim 1, wherein pressing the thermally stable polycrystalline diamond body at an elevated, temperature comprises infiltrating the thermally stable polycrystalline diamond body with an infiltrant material.

3. The method of claim 2, wherein the infiltrant material comprises cobalt from the substrate.

4. The method of claim 2, further comprising removing at least a portion of the infiltrant material from at least a portion of the bonded thermally stable polycrystalline diamond body.

5. The method of claim 4, wherein removing a portion of the infiltrant material comprises removing a substantial portion of the infiltrant material from a cutting surface of the bonded thermally stable polycrystalline diamond body opposite the substrate.

6. The method of claim 1, wherein the vacuum is sufficient to remove at least 80% of such residual materials from the thermally stable polycrystalline diamond body.

7. The method of claim 1, wherein the vacuum is approximately $10^{-4}$ Torr or lower.

8. The method of claim 1, wherein the vacuum is approximately $10^{-6}$ Torr or lower.

9. The method of claim 1, wherein heating the thermally stable polycrystalline diamond body and the substrate to remove residual materials and subjecting the thermally stable polycrystalline diamond body and the substrate to a vacuum comprise applying the vacuum before heating, and maintaining the vacuum during heating.

10. The method of claim 9, wherein heating the thermally stable polycrystalline diamond body and the substrate to remove residual materials comprises heating to a first temperature to clean the thermally stable polycrystalline diamond body, and subsequently heating to a second temperature to seal the enclosure maintaining a vacuum inside the enclosure.

11. The method of claim 10, wherein the enclosure comprises a braze material for sealing the enclosure, and wherein heating to the second temperature comprises heating to at least the melting temperature of the braze material.

12. The method of claim 1, wherein heating the thermally stable polycrystalline diamond body and the substrate to remove residual materials and subjecting the thermally stable polycrystalline diamond body and the substrate to a vacuum occur sequentially, with the subjecting occurring after the heating.

13. The method of claim 12, further comprising cooling the enclosure after heating, and sealing the enclosure maintaining a vacuum inside after cooling.

14. The method of claim 13, wherein sealing the enclosure comprises welding at room temperature.

15. The method of claim 1, wherein the catalyst material comprises cobalt.

16. The method of claim 1, further comprising sealing the enclosure for maintaining a vacuum inside the enclosure.

17. The method of claim 1 wherein preventing contact comprises insulating the thermally stable polycrystalline diamond body from contact with the enclosure when said thermally stable polycrystalline diamond body is placed in the enclosure.

18. A method of forming a thermally stable polycrystalline diamond cutting element, comprising:
- sintering a plurality of diamond crystals and a catalyst material at high temperature and high pressure to form a polycrystalline diamond material body;
- removing substantially all of the catalyst material from at least a portion of the polycrystalline diamond material body to form a thermally stable material body;
- placing the thermally stable material and a substrate into an enclosure having an opening;
- sealing the enclosure for maintaining a vacuum inside the enclosure; and
- bonding the thermally stable material body to the substrate inside the vacuum-sealed enclosure at high temperature and high pressure while preventing the thermally stable material body from contacting the enclosure to form a bonded thermally stable polycrystalline diamond cutting element, wherein said enclosure is exposed to said high pressure.

19. The method of claim 18, wherein sealing the enclosure with a vacuum inside comprises:
- applying a vacuum to the enclosure;
- heating the enclosure to a first temperature to remove residual materials from the thermally stable material; and
- simultaneously maintaining the vacuum and heating the enclosure to a second temperature to sealingly attach a cover to the enclosure and seal the enclosure maintaining the vacuum inside.

20. The method of claim 19, wherein the enclosure comprises a can for receiving the thermally stable material and the substrate, a lid for closing the can, and a braze material for sealing the can.

21. The method of claim 19, wherein the vacuum is sufficient to remove at least 80% of such residual materials from the thermally stable material body.

22. The method of claim 19, wherein the vacuum is approximately $10^{-6}$ Torr or lower.

23. The method of claim 18 comprising insulating the thermally stable polycrystalline diamond body for preventing contact with the enclosure.

24. A method of forming a thermally stable polycrystalline diamond cutting element, comprising:
- forming a polycrystalline diamond material body attached to a first substrate;
- separating the first substrate from the polycrystalline diamond material body;
- leaching the polycrystalline diamond material body to remove a substantial portion of a catalyst material and form a thermally stable polycrystalline diamond material body having a residual portion comprising, an oxide or gas;
- bonding the thermally stable polycrystalline diamond material body to a second substrate in a can at a vacuum sufficient to remove at least 80% of the residual portion from the thermally stable polycrystalline diamond material body; and
- preventing contact of the thermally stable polycrystalline body with said can during bonding.

25. A method for forming a cutting element, comprising:
- placing a thermally stable polycrystalline diamond body and a substrate into an enclosure, wherein the thermally stable polycrystalline diamond body is a polycrystalline diamond material body having at least a substantial portion of a catalyst material used to form said polycrystalline diamond material body removed;
- insulating the thermally stable polycrystalline diamond body from contact with the enclosure when said thermally stable polycrystalline diamond body in placed in the enclosure;
- heating the thermally stable polycrystalline diamond body and the substrate to remove residual materials from the thermally stable polycrystalline diamond body;
- subjecting the thermally stable polycrystalline diamond body and the substrate to a vacuum for evacuating such residual materials; and
- pressing the enclosure, the thermally stable polycrystalline diamond body and the substrate to bond the thermally stable polycrystalline diamond body to the substrate, wherein said thermally stable polycrystalline diamond body and said substrate are pressed at an elevated temperature.

26. The method of claim 25, further comprising:
- sintering diamond crystals and the catalyst material at high temperature and high pressure to form the polycrystalline diamond material body; and
- removing at least a substantial portion of the catalyst material from the polycrystalline diamond material body to form the thermally stable polycrystalline diamond body.

* * * * *